United States Patent
Ortiz Egea

(10) Patent No.: US 11,520,052 B2
(45) Date of Patent: Dec. 6, 2022

(54) ADAPTIVE PROCESSING IN TIME OF FLIGHT IMAGING

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 16/913,676

(22) Filed: Jun. 26, 2020

(65) Prior Publication Data

US 2021/0405199 A1    Dec. 30, 2021

(51) Int. Cl.
| | |
|---|---|
| *G01S 17/894* | (2020.01) |
| *G01S 7/4865* | (2020.01) |
| *G01S 17/26* | (2020.01) |
| *G01S 17/90* | (2020.01) |
| *G01S 17/00* | (2020.01) |

(52) U.S. Cl.
CPC .......... *G01S 17/894* (2020.01); *G01S 7/4865* (2013.01); *G01S 17/26* (2020.01); *G01S 17/90* (2020.01)

(58) Field of Classification Search
CPC ...... G01S 17/894; G01S 7/4865; G01S 17/26; G01S 17/90; G01S 7/484; G01S 7/4863; G01S 17/36; G01S 7/497; G06V 20/52; H04N 13/128
See application file for complete search history.

(56) References Cited

U.S. PATENT DOCUMENTS

| | | | |
|---|---|---|---|
| 8,674,691 B2 | 3/2014 | Du | |
| 8,780,113 B1* | 7/2014 | Ciurea | H04N 13/128 |
| | | | 382/154 |
| 9,405,008 B2* | 8/2016 | Raskar | G01S 17/894 |
| 10,061,005 B2 | 8/2018 | Li et al. | |
| 10,557,921 B2* | 2/2020 | Bleyer | G01S 7/497 |
| 10,924,692 B2* | 2/2021 | Ortiz Egea | G01S 17/894 |
| 11,245,875 B2* | 2/2022 | Ortiz Egea | G06V 20/52 |

(Continued)

OTHER PUBLICATIONS

D. Droeschel, D. Holz and S. Behnke, "Multi-frequency Phase Unwrapping for Time-of-Flight cameras," 2010 IEEE/RSJ International Conference on Intelligent Robots and Systems, 2010, pp. 1463-1469, Taipei, Taiwan, Republic of China; doi: 10.1109/IROS.2010.5649488. (Year: 2010).*

(Continued)

*Primary Examiner* — Bernarr E Gregory
(74) *Attorney, Agent, or Firm* — Alleman Hall Creasman & Tuttle LLP

(57) ABSTRACT

Examples are disclosed herein relating to signal processing in a time-of-flight (ToF) system. One example provides, a method comprising emitting, via a light source, amplitude-modulated light toward an object, acquiring, via an image sensor comprising a plurality of pixels, a plurality of image frames capturing light emitted from the light source that is reflected by the object, wherein the plurality of image frames are acquired at two or more different frequencies of the amplitude-modulated light and collectively form a multifrequency frame, and for each pixel of the multifrequency frame, determining a brightness level, applying an adaptive denoising process by setting a kernel size based on the brightness level, and performing a phase unwrapping process to determine a depth value for the pixel.

20 Claims, 11 Drawing Sheets

(56) References Cited

U.S. PATENT DOCUMENTS

| | | | |
|---|---|---|---|
| 2011/0188028 A1* | 8/2011 | Hui | G01S 17/36 356/5.01 |
| 2012/0033045 A1* | 2/2012 | Schweizer | G01S 17/894 348/46 |
| 2014/0313376 A1* | 10/2014 | Van Nieuwenhove | G01S 7/4865 348/241 |
| 2018/0011195 A1* | 1/2018 | Perry | G01S 17/36 |
| 2018/0321347 A1 | 11/2018 | Wang et al. | |
| 2019/0302244 A1 | 10/2019 | Egea | |

OTHER PUBLICATIONS

J. Mei, A. Kirmani, A. Colaço and V. K. Goyal, "Phase unwrapping and denoising for time-of-flight imaging using generalized approximate message passing," 2013 IEEE International Conference on Image Processing, 2013, pp. 364-368, doi: 10.1109/ICIP.2013.6738075; IEEE, Piscataway, NJ, USA. (Year: 2013).*

D. Droeschel, D. Holz and S. Behnke, "Probabilistic Phase Unwrapping for Time-of-Flight Cameras," ISR 2010 (41st International Symposium on Robotics) and ROBOTIK 2010 (6th German Conference on Robotics), 2010, pp. 1-7. (Year: 2010).*

Crabb, Ryan Eugene, "Fast Time-of-Flight Phase Unwrapping and Scene Segmentation Using Data Driven Scene Priors", In Dissertation of University of California, Dec. 2015, 146 Pages.

Fang, et al., "Background Field Removal Using A Region Adaptive Kernel for Quantitative Susceptibility Mapping of Human Brain", In Journal of Magnetic Resonance, Aug. 1, 2017, 1-25.

Bioucas-Dias, et al., "Absolute Phase Estimation: Adaptive Local Denoising and Global Unwrapping", In Journal of Applied Optics, vol. 47, Issue 29, Oct. 10, 2008, pp. 5358-5369.

Mei, et al., "Phase Unwrapping and Denoising For Time-Of-Flight Imaging Using Generalized Approximate Message Passing", In Proceedings of IEEE International Conference on Image Processing, Sep. 15, 2013, pp. 364-368.

"Application as filed in U.S. Appl. No. 16/391,117", filed Apr. 22, 2019., 45 Pages.

Watson, Charles C., "An Improved Kernel for Analytical Time-of-Flight Pet Reconstruction", In Proceedings of IEEE Nuclear Science Symposium Conference Record, Oct. 26, 2007, pp. 2721-2726.

* cited by examiner

ADAPTIVE PROCESSING IN TIME OF FLIGHT IMAGING

BACKGROUND

Time-of-flight (ToF) imaging systems may be used to produce a depth image of an environment, with each pixel of the depth image representing a distance to a corresponding point in the environment. The distance to a point on an imaged surface in the environment is determined based on the length of the time interval in which light emitted by the imaging system travels out to that point and then returns back to a sensor array in the imaging system. An optical ToF camera measures this interval for many points on the surface and thereby assembles a depth image in which a depth coordinate for each pixel in the depth image is proportional to the ToF observed at that pixel.

SUMMARY

Examples are disclosed that relate to signal processing in a time-of-flight (ToF) system. One example provides a method comprising emitting, via a light source, amplitude-modulated light toward an object, and acquiring, via an image sensor comprising a plurality of pixels, a plurality of image frames capturing light emitted from the light source that is reflected by the object, wherein the plurality of image frames are acquired at two or more different frequencies of the amplitude-modulated light and collectively form a multifrequency frame. The method further comprises, for each pixel of the multifrequency frame, determining a brightness level, applying an adaptive denoising process by setting a kernel size based on the brightness level, and performing a phase unwrapping process to determine a depth value for the pixel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Optical ToF imaging may determine a depth of a subject (as a distance from an image sensor of a ToF camera) based on an amplitude-modulated light signal emitted by a time-of-flight illuminator. 'Phase-based' optical ToF imaging is a variant in which depth is computed based on the phase shift of the modulated light reflected back from a subject. However, accurate measurement of the distance from the ToF imaging system to the subject based on phase shift may be challenging, especially in the presence of noise.

The phase shift is proportional to the subject's distance modulo the wavelength of the modulation frequency. Thus, distances larger than the wavelength may create distance ambiguities, as the phase shift repeats at multiples of $2\pi$. 'Phase unwrapping' or 'de-aliasing' is a way to disambiguate the phase shift data and identify the correct distance value by illuminating the scene with amplitude-modulated light of a plurality of different frequencies, as the distance ambiguities are different for each frequency of illumination light.

Previous phase unwrapping approaches may unwrap on a pixel by pixel basis in the phase domain. Some phase unwrapping approaches may adapt for different lighting intensities at different pixels. However, current adaptive methods based in the phase domain may pose difficulties in areas of rapid transitions (e.g. at each border between 0 and $2\pi$), even when used with edge preserving weighting factors, due to different weights being assessed for each frequency independently.

Accordingly, examples are disclosed that relate to performing adaptive denoising and adaptive phase unwrapping in the complex domain based on brightness levels. The examples herein utilize variable kernel sizes to help mitigate situations in which brightness levels are in the extremes (low or high). The use of larger kernels together with edge-preserving weighting factors in pixels with low brightness may help to increase a local signal-to-noise ratio, thereby helping to increase a likelihood of unwrapping correctly and edge-preserving factors may be used to preserve some high-frequency content in edge regions. Likewise, the use of smaller kernels in pixels with high brightness may help to preserve high frequency details.

Figure 1:
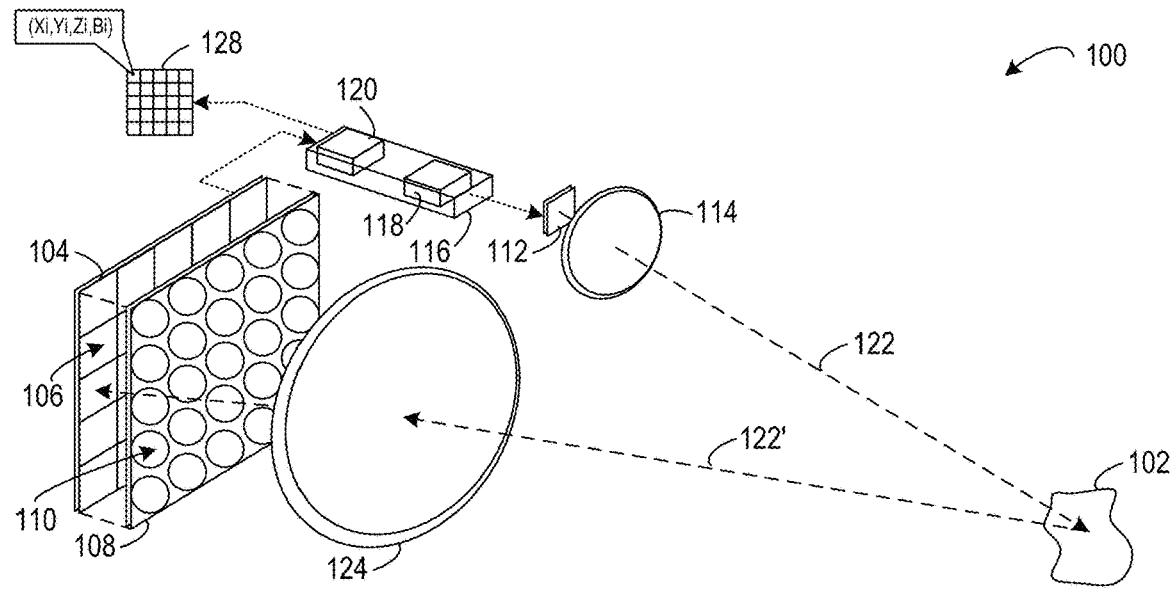
FIG. 1 shows a schematic depiction of an example ToF camera.

FIG. 1 shows aspects of an example ToF camera 100 that may be operated according to the disclosed examples. The term 'camera' refers herein to any imaging component having at least one optical aperture and sensor array configured to image a scene or subject 102. Further, the term "ToF system" may be used herein to refer to any system that processes ToF image data from a ToF camera. In some examples, a ToF system may include an integrated ToF camera, while in other examples a ToF system may receive data from a remote ToF camera.

Camera 100 includes a sensor array 104 comprising a plurality of individually addressable pixels 106. Each pixel 106 may include a plurality of pixel taps, or detection units that each detects samples. In some implementations, the pixels may be complementary metal-oxide semiconductor (CMOS) elements, but other suitable architectures are also envisaged. Each pixel may be responsive to light over a broad wavelength band, although this is not required. For silicon-based pixels, the wavelength response may range from 300 to 1100 nm, for example. For germanium-based pixels, the wavelength response may range from 800 to 1700 nm, for example. Sensor array 104 is schematically illustrated with twenty-five individually addressable pixels 106 for simplicity, although any suitable number of pixels 106 may be used.

Microlens array 108 optionally may be arranged directly over sensor array 104. Microlens array 108 includes a plurality of microlens elements 110. Each microlens element 110 of microlens array 108 may be registered to a pixel 106 of the sensor array 104.

A ToF illuminator 112 is configured to emit active (amplitude modulated) IR light to illuminate the subject 102. In one example, the ToF illuminator 112 includes an IR laser configured to emit IR light. In some examples, the ToF illuminator 112 optionally may include a diffuser 114 covering a field of illumination of the ToF illuminator 112. Depth measurements may be taken using IR light, including near infrared (NIR) light, far infrared (FIR) light, or any other suitable wavelength. Although not shown in FIG. 1, the camera optionally may include a bandpass filter to limit the portion of the electromagnetic spectrum reaching the pixels 106 to the portion of the electromagnetic spectrum emitted by the ToF illuminator 112.

Electronic controller 116 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 116 includes a ToF controller machine 118 and an output machine 120 that may be operatively connected to the sensor array 104 and/or the ToF illuminator 112. Machines 118 and 120 may be implemented as separate physical hardware and/or firmware components or incorporated into a single hardware and/or firmware component.

The ToF controller machine 118 is configured to repeatedly activate the ToF illuminator 112 and synchronously address the pixels 106 of sensor array 104 to acquire IR images. The active light signal emitted from the ToF illuminator 116 may be amplitude modulated at different modulation frequencies for different image data samples. In the illustrated example, the ToF controller machine 118 activates the ToF illuminator 112 to illuminate the subject 102 with active IR light 122 and addresses the pixels 106 of sensor array 104 in synchronicity. IR light 122' reflects from the subject 102 back to the camera 100. The reflected IR light 122' passes through receiving optics 124 and is incident on the pixels 106 of the sensor array 104 to provide a measurement. In the illustrated example, IR light 122' is measured by a pixel 106 of sensor array 104, thus providing phase information useable with the knowledge of the camera's configuration to determine the world space position of a locus of subject 102.

The ToF controller machine 118 is configured to generate a depth image 128 based on a plurality of captured IR image data samples. The term 'depth image' refers to an array of individually addressable image pixels registered to corresponding regions $(X_i, Y_i)$ of an imaged scene, with a depth value $Z_i$ indicating, for each image pixel, the depth of the corresponding region. 'Depth' is defined as a coordinate parallel to the optical axis of the camera, which increases with increasing distance from the camera. The term 'depth video' refers herein to a time-resolved sequence of depth images. The output machine 120 is configured to output the depth image 128 generated by the ToF controller machine 118. The output machine 120 may be configured to output the depth image 128 in any suitable form. In some examples, the output machine 120 may output the depth image 128 as a data structure in which each element of the matrix corresponds to a different pixel.

Figure 2:
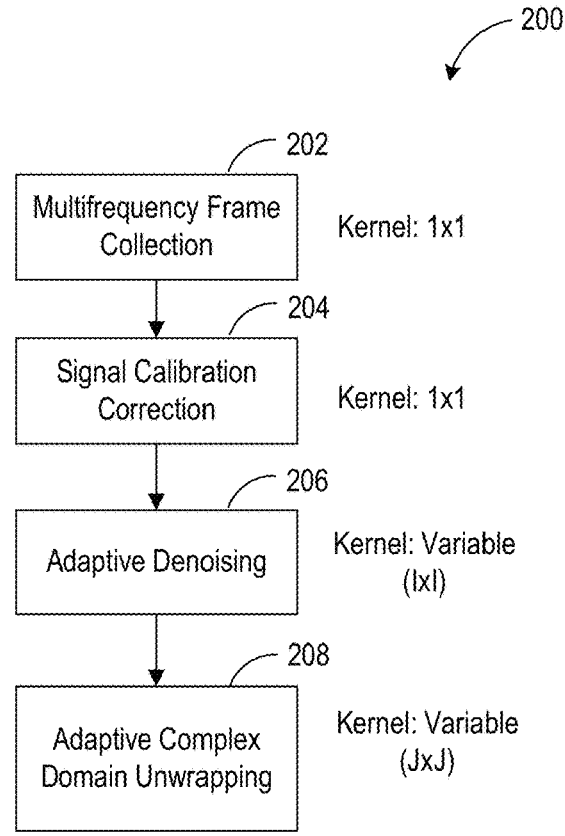
FIG. 2 shows a flow diagram of an example method of processing signals in a ToF system.

FIG. 2 shows a flow diagram depicting an example method 200 for signal processing in a ToF system. Method 200 includes, at 202, performing multifrequency frame collection by capturing image samples at a plurality of different illumination light modulation frequencies. In some examples, image samples may be captured at three different modulation frequencies. In other examples, samples may be captured at two different modulation frequencies, or four or more modulation frequencies. Further, at each modulation frequency, multiple image samples may be captured at different phases of the illumination light source. In some examples, three images may be acquired at different phases of each illumination light frequency. Thus, in some examples, a single multifrequency frame may include data from nine exposures of the image sensor—three different phase samples at each of three different illumination modulation frequencies. In other examples, a multifrequency frame may have any suitable number of exposures at any suitable number of illumination frequencies.

Method 200 further comprises, at 204, performing signal calibration correction. Signal calibration may compensate for temperature, for the delay in reading the pixel, and for various fixed pattern noises such as dark signal non-uniformity (DSNU) or photo response non-uniformity (PRNU), as examples. After signal calibration correction, method 200 comprises, at 206, performing adaptive denoising on a pixel-by-pixel basis to reduce noise levels in the multifrequency frame, and then, at 208, performing complex domain unwrapping for each pixel to determine a distance for that pixel. In some examples, the complex domain unwrapping 208 also may be adaptive.

As explained in more detail below, adaptive denoising 206 and complex domain unwrapping 208 are performed in the complex domain and utilize variable kernel sizes based upon brightness level, such that a larger kernel is used for pixels having lower light intensities, and a smaller kernel is used for pixels having higher light intensities. While the use of a larger kernel size for pixels having lower light intensities may result in the loss of some high frequency information, the larger kernel size also may provide more consistent data throughout the image compared to methods that utilize a fixed kernel size.

In some examples, adaptive denoising 206 may be applied by varying the kernel size based upon a number of discrete brightness level ranges. As mentioned above, larger kernel sizes may be used for lower brightness levels, while smaller kernel sizes may be used for higher brightness levels. As one more specific example, a kernel size of 7×7 may be used for brightness levels of 0-30 β, a kernel size of 5×5 for brightness levels of 30-1000 β a kernel size of 3×3 for brightness levels of 1000-3000 β, and a kernel size of 1×1 for brightness levels above 3000 β. The discrete brightness levels and kernel sizes used may depend on properties of the ToF sensor. In other examples, any other suitable brightness levels and/or corresponding kernel sizes may be used. It will be understood that "brightness" as used herein may refer to active brightness in which the brightness level arises from active illumination, and also may include any other suitable source(s) of illumination. In yet other examples, varying the kernel size may include calculating the kernel size by padding it based on a suitable formula that takes into account the variability of the noise, in addition to brightness levels. As an example, padding the kernel size may be calculated from the variability of the noise, $\Sigma_{i=-I}^{I}\Sigma_{j=-J}^{J}\|\tilde{S}(m,n,k)-\tilde{S}(i,j,k)\|^2$. This calculation may help to more suitably apply adaptive denoising in a situation in which there is high ambient light as well as high noise by applying a larger kernel.

Figure 3:
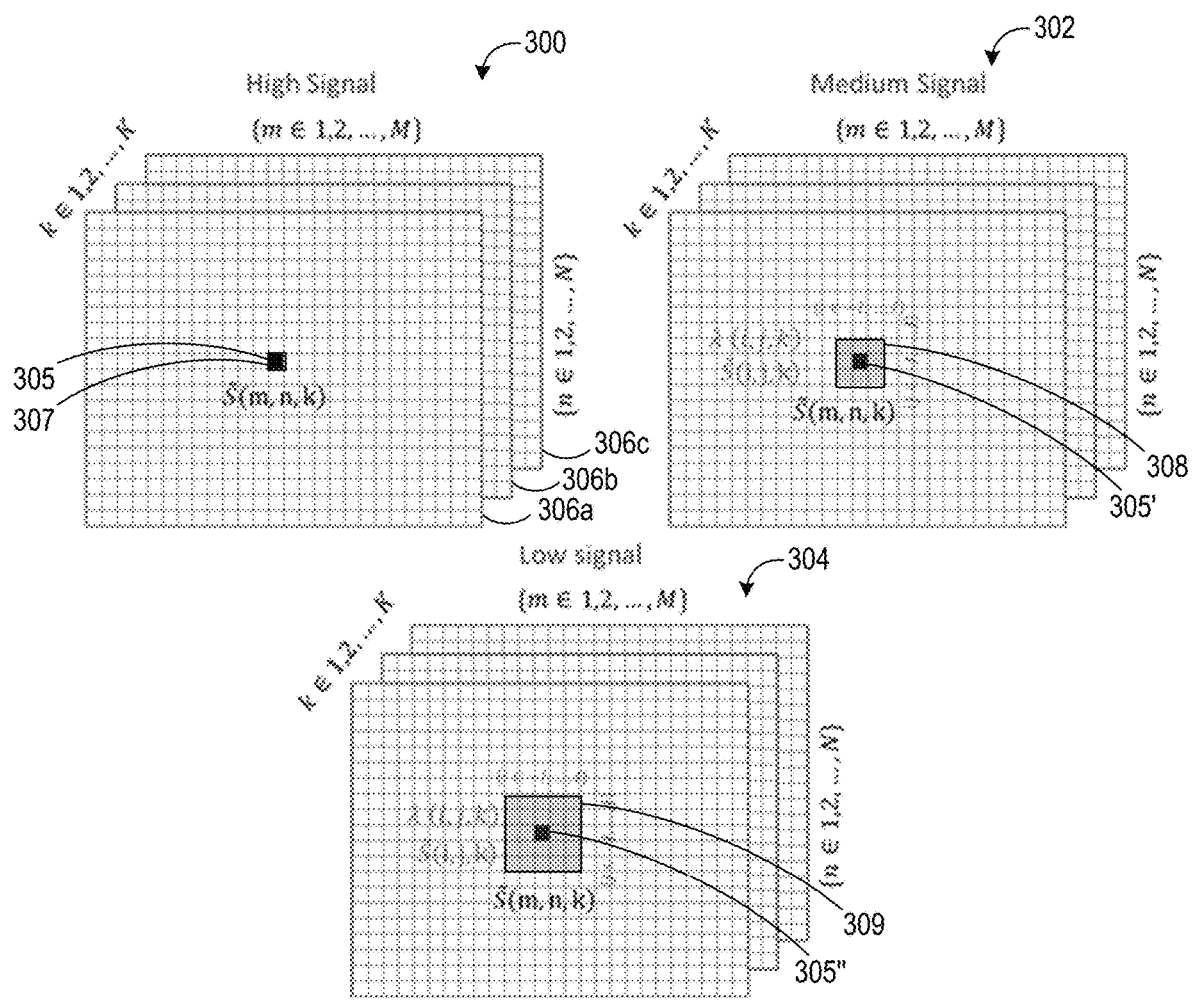
FIG. 3 shows a schematic depiction of example kernel sizes that may be used at different signal levels in an adaptive denoising process in a ToF system.

FIG. 3 illustrates example kernel sizes used in an adaptive denoising process. More specifically, FIG. 3 shows a multifrequency frame 300 comprising a kernel adapted for a relatively higher signal (brightness), a multifrequency frame 302 comprising a kernel adapted for a relatively intermediate signal, and a multifrequency frame 304 adapted for a relatively lower signal.

Multifrequency frame 300 comprises a plurality of pixels (m, n) arranged in an array of two-dimensional size (M, N) with {m∈1, 2, . . . M}, and {n∈1, 2, . . . N}. Multifrequency frame 300 further comprises data for active illumination frequencies k∈1, 2, . . . K (e.g., first frequency 306a, second frequency 306b, and third frequency 306c). A kernel used for denoising a selected pixel 305 is illustrated at 307, and comprises a size of 1×1 pixel. As a signal-to-noise ratio of a signal $\tilde{S}$ at the pixel 305 is relatively higher, a smaller denoising kernel may be used with less risk of noise impacting a depth value determined for the pixel.

In contrast, multifrequency frame 302 has a lower intensity signal S than multifrequency frame 300 at pixel 305'. As such, a larger kernel 308 may be used for multifrequency frame 302 compared to kernel 307 of multifrequency frame 300. In the depicted example, the kernel 308 comprises a size of 3×3 pixels. Kernel 308 correlates information from multiple neighboring pixels surrounding pixel 305' to help provide a more accurate assessment of the signal.

Multifrequency frame 304 has a lower intensity signal $\tilde{S}$ at pixel 305" than multifrequency frame 300 or multifrequency frame 302 for corresponding pixels 305 and 305'. As such, multifrequency frame 304 uses a larger kernel 309 to correlate information from an even greater number of neighboring pixels surrounding the selected pixel 305". In this example, kernel 309 comprises a size of 5×5 pixels.

For each of pixel 305' in multifrequency frame 302 and pixel 305" in multifrequency frame 304, signal processing is based on information identified not only for the selected pixel (m, n), but also from neighboring pixels (i, j) respectively in kernels 308 and 309. The contribution of neighboring pixels in the kernels may be based on normalized weighting coefficients $\lambda(i, j)$, which may provide an adaptive way of processing the signal to help preserve details at edges in the resulting depth images. As an example, more weight may be applied in relatively lower signal-to-noise scenarios compared to relatively higher signal-to-noise scenarios. This may help to preserve the high frequency components of the image.

One example of a suitable adaptive denoising process using kernels 307, 308 and 309 is as follows. Let $\tilde{S}(m, n, k)$ be the experimental signal corresponding to each pixel (m, n) for the k frequency, of an array of size (M, N) with {m∈1, 2, . . . , M}, and {n∈1, 2, . . . , N}, for a frequency k∈1, 2, . . . , K. The signal with reduced noise is denoted by S (m, n, k), shown in Equation 1 below, defined as the weighted sum of the pixels of the neighborhood, {i∈-I, -I+1, . . . , I} and {j∈-J, -J+1, . . . , J}.

$$S(m, n, k) = \sum_{i=-I}^{I} \sum_{j=-J}^{J} \lambda(i, j, k) \tilde{S}(m, n, k) \text{ with } \sum_{i=-I}^{I} \sum_{j=-J}^{J} \lambda(i, j, k) = 1 \qquad \text{Eq 1}$$

where $\lambda(i, j, k)$ are the edge-preserving normalized weighting coefficients. As examples of the coefficients for $\lambda(i, j, k)$, Equation 2 shows an example bilateral filter in the complex domain, where $\sigma_{sm}^2$ and $\sigma_{sh}^2$ are parameters that may be varied to adjust the smoothing or sharpening. The bilateral filter shown in Equation 2 may be referred to as a joint bilateral filter (JBLF).

$$\lambda(i, j, k) = \frac{1}{Norm(m, n, k)} \xi(i, j, k) \qquad \text{Eq 2}$$

where $$\xi(i, j, k) = \exp\{-[(m-i)^2 + (n-j)^2]/\sigma_{sm}^2\}$$

$$\exp[-\|\tilde{S}(m, n, k) - \tilde{S}(i, j, k)\|^2/\sigma_{sh}^2], \text{ and}$$

$$Norm(m, n, k) = \sum_{i=-I}^{I} \sum_{j=-J}^{J} \xi(i, j, k)$$

While the use of a larger kernel may provide for greater accuracy and consistence in distance measurement for pixels having relatively lower intensities, it may also be more computationally intensive compared to the pixel-wise technique used for multifrequency frame 300. Thus, varying the size of the kernel used for denoising depending on the brightness level may allow for larger kernels to be used only where needed (e.g., in parts of the image with low brightness), which may help to save computational power and complexity in a ToF system. It will be understood that the kernel sizes presented above are presented as examples, and any other suitable kernel sizes may be used.

In other examples, a quasi-mean filter may be used to help increase signal-to-noise ratios and reduce unwrapping errors by using high values of $\sigma_s^2$, such that all the values in the kernel are approximately 1. This may produce a faster filter by neglecting the blurring or spatial term $\exp\{-[(m-i)^2+(n-j)^2]/\sigma_{sm}^2\}$. Such a filter may be referred to as a truncated joint bilateral filter (TJBLF).

The TJBLF may be made faster by using a Taylor expansion, as shown in Equation 3. When S(k, l)~S(n,m), the exponential term tends to 1. Such an expansion may be beneficial for enhancing edges, since it produces significant differences on the weighting coefficients γ(i, j, k) that are different either in active brightness or in phase.

$$\gamma(i, j, k) \rightarrow 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2} \qquad \text{Eq 3}$$

In addition, in some examples the TJBLF may use an indicator function ($I_\tau$) to increase the sharpening by convolving a step function with the coefficients obtained from the truncated sharpening, as shown in Equation 4.

$$\xi(i,j,k) = \gamma(i,j,k) I_\tau(m,n,k) \qquad \text{Eq 4}$$

In Equation 4, the indicator function may be defined as 1 for the values below a threshold, as shown in Equation 5.

$$I_\tau(m, n, k) = \begin{cases} 0 \text{ if } \gamma(i, j, k) < \tau(m, n, k) \\ 1 \text{ if } \gamma(i, j, k) \geq \tau(m, n, k) \end{cases} \quad \text{Eq 5}$$

For the calculation of the threshold level for the indicator function, in some examples a fixed value may be used, where $\tau(m, n, k)=\tau$. In other examples, a variable value may b used, where the value of $\tau(m, n, k)$ depends on a function that incorporates the value of the variability of the signal in the kernel and the local signal. This function allows adaptation of the threshold, helping to preserve frequencies, enhance edges, and manage the effect of ambient light. Examples of suitable $\tau$ functions are as follows, where $\mu(m, n, k)=\Sigma_{i=-I}^{I}\Sigma_{j=-J}^{J}\|\tilde{S}(m, n, k)-\tilde{S}(i, j, k)\|^2$:

$$\tau(m, n, k) = \alpha - \frac{\beta}{\mu(m, n, k)} \text{ with } \alpha, \beta \text{ constants} \quad (1)$$

$$\tau(m, n, k) = \quad (2)$$

$$\begin{cases} \exp\left[-\alpha\sqrt{\frac{1}{AB(m, n, k)\mu(m, n, k)}}\right] \text{ if } \mu(m, n, k) > th \\ \exp\left[-\alpha\sqrt{\frac{\mu(m, n, k)}{AB(m, n, k)}}\right] \text{ if } \mu(m, n, k) > \leq th \end{cases} \text{ with}$$

$\alpha$ constant $$\tau(m, n, k) = \quad (3)$$

$$\begin{cases} \exp\left[-\frac{\alpha}{AB(m, n, k)\mu(m, n, k)}\right] \text{ if } \mu(m, n, k) > th \\ \exp\left[-\alpha\frac{\mu(m, n, k)}{AB(m, n, k)}\right] \text{ if } \mu(m, n, k) > \leq th \end{cases} \text{ with } \alpha \text{ constant}$$

In some examples, one or more filters other than the filters described above may be used to help calculate the coefficients for $\lambda(i, j, k)$ in Equation 2. As examples, suitable filters may include a box filter, guided filter, bilateral filter, JBLF, TJBLF, and combinations thereof.

Figure 4:
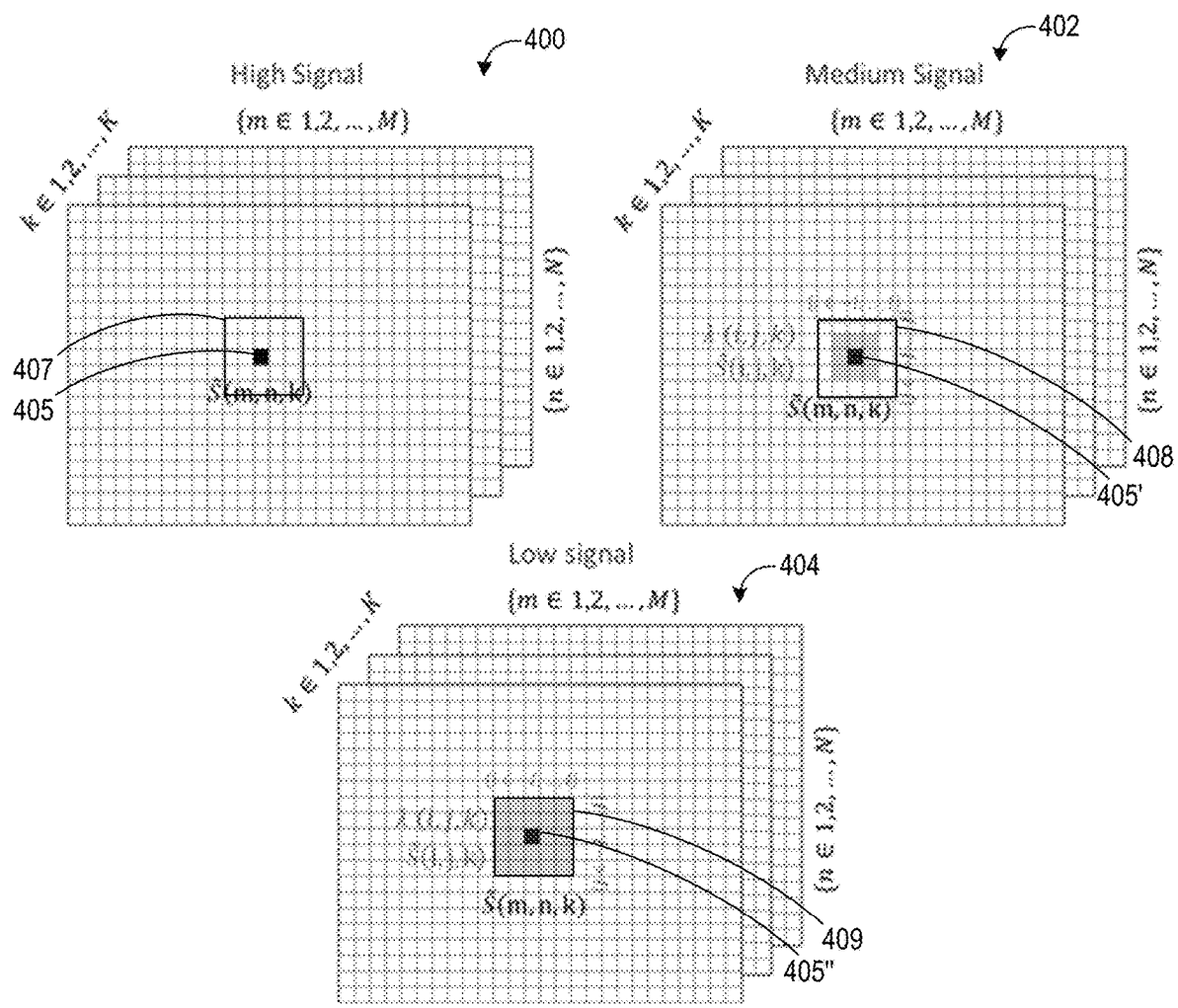
FIG. 4 shows a schematic depiction of example kernels comprising zeroes added to a fixed size kernel to adjust the kernel size in an adaptive denoising process.

For some ToF sensors, a hardware processor of the ToF sensor may utilize a fixed kernel size. In such examples, rather than adjusting the kernel size, adaptive denoising may be applied by filling locations in the fixed-size kernel with zeroes to create effectively smaller kernel sizes. FIG. 4 illustrates example fixed-size kernels used in an adaptive denoising process in the context of example multifrequency frames. FIG. 4 illustrates a multifrequency frame 400 comprising a fixed-size kernel adapted for a relatively higher signal (brightness), a multifrequency frame 402 comprising a fixed-size kernel adapted for a relatively intermediate signal, and a multifrequency frame 404 comprising a fixed-size kernel adapted for a relatively lower signal. A fixed-size kernel used for denoising a selected pixel 405 is illustrated at 407. Fixed-size kernel 407 comprises a size of 5×5 pixels. As described above, a smaller kernel may be used for a pixel with a relatively higher signal-to-noise ratio of a signal $\tilde{S}$ to help preserve high frequency details. As such, locations in fixed-size kernel 407 are filled with zeros to create an effective kernel size of 1×1 pixel.

In contrast, multifrequency frame 402 has a lower intensity signal $\tilde{S}$ than multifrequency frame 400 at pixel 405'. As such, a fixed-size kernel 408 used for denoising selected pixel 405' may be filled with a fewer number of zeroes than fixed-size kernel 407, effectively creating a kernel of size 3×3 pixels.

Further, multifrequency frame 404 has a lower intensity signal S at pixel 405" than for pixels 405 and 405'. As such, multifrequency frame 404 uses a kernel 409 having the given fixed-kernel size of 5×5 pixels, without filling any locations of the kernel 409 with zeroes, thereby correlating information from a greater number of neighboring pixels surrounding the selected pixel 405".

In some examples, a process that is adaptive to brightness levels may also be applied to complex domain unwrapping. As an example, to isolate the experimental cosine (cos $[\tilde{\phi}(i, j, k)]$) and sine (sin $[\tilde{\phi}(i, j, k)]$), the real ($\tilde{S}_r(i, j, k)$) and imaginary ($\tilde{S}_i(i, j, k)$) signals ($\tilde{S}(i, j, k)$) corresponding to the frequency k are divided by the active brightness ($\widetilde{AB}(i, j, k)$), as shown in Equation 6.

$$\begin{cases} \cos [\tilde{\phi}(i, j, k)] = \frac{\tilde{S}_r(i, j, k)}{\widetilde{AB}(i, j, k)} \\ \sin [\tilde{\phi}(i, j, k)] = \frac{\tilde{S}_i(i, j, k)}{\widetilde{AB}(i, j, k)} \end{cases} \quad \text{Eq 6}$$

$$\text{where } \widetilde{AB}(i, j, k) = \sqrt{(\tilde{S}_r(i, j, k))^2 + (\tilde{S}_i(i, j, k))^2}$$

The signal with reduced noise may be defined in an analogous way to Equation 1, as shown in Equation 7.

$$\begin{cases} \cos [\phi(i, j, k)] = \sum_{i=-I}^{I}\sum_{j=-J}^{J} \lambda(i, j, k) \cos [\tilde{\phi}(i, j, k)] \\ \sin [\phi(i, j, k)] = \sum_{i=-I}^{I}\sum_{j=-J}^{J} \lambda(i, j, k) \sin [\tilde{\phi}(i, j, k)] \end{cases} \quad \text{Eq 7}$$

where $\lambda(i, j, k)$ may calculated in a similar manner as in Equation 2.

Figure 5:
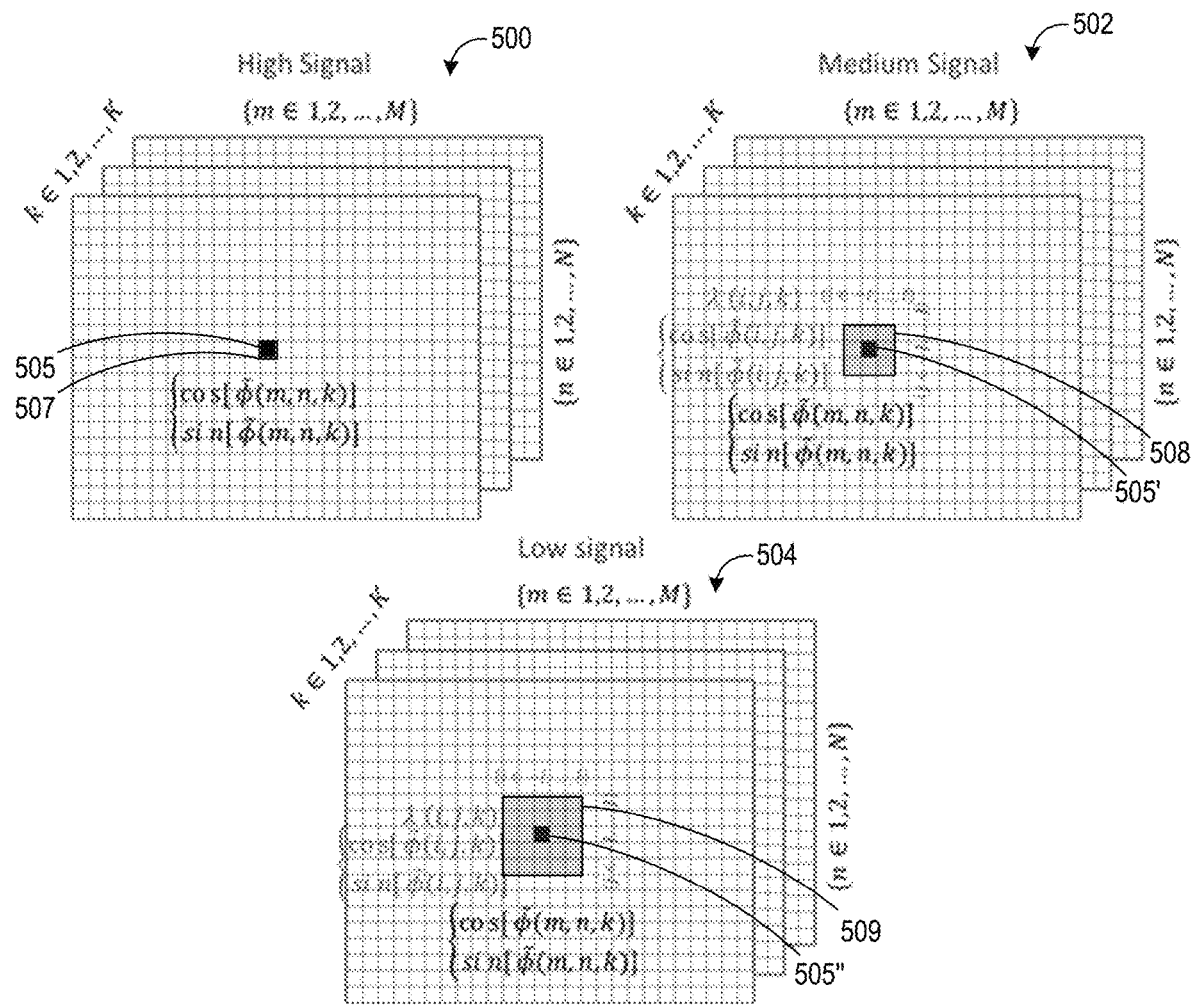
FIG. 5 shows a schematic depiction of an example adaptive complex domain unwrapping using different sized kernels for different signal levels.

The kernels used for adaptive complex domain unwrapping may be adjusted based upon brightness to help compute values for both the real ($\tilde{S}_r(i, j, k)$) and imaginary ($\tilde{S}_i(i, j, k)$) signals. FIG. 5 illustrates example kernel sizes that may be used in an adaptive complex domain unwrapping process for a multifrequency frame 500 at relatively higher signal, a multifrequency frame 502 a relatively intermediate signal, and a multifrequency frame 504 at a relatively lower signal. Similar to FIG. 3 for adaptive denoising, a kernel 507 used for complex domain phase unwrapping of a selected pixel 505 has a kernel size of 1×1 pixel.

In contrast, multifrequency frame 502 has a lower intensity signal S than multifrequency frame 500 at pixel 505'. As such, a larger kernel 508 may be used having a size of 3×3 pixels. Kernel 508 correlates information from multiple neighboring pixels surrounding pixel 505' to help provide more information for phase unwrapping. Further, multifrequency frame 504 has a lower intensity signal $\tilde{S}$ at pixel 505" than at pixels 505 and 505', and therefore uses a larger kernel 509 to correlate information from an even greater number of neighboring pixels surrounding the selected pixel 505". In this example, kernel 509 comprises a size of 5×5 pixels.

Figure 6:
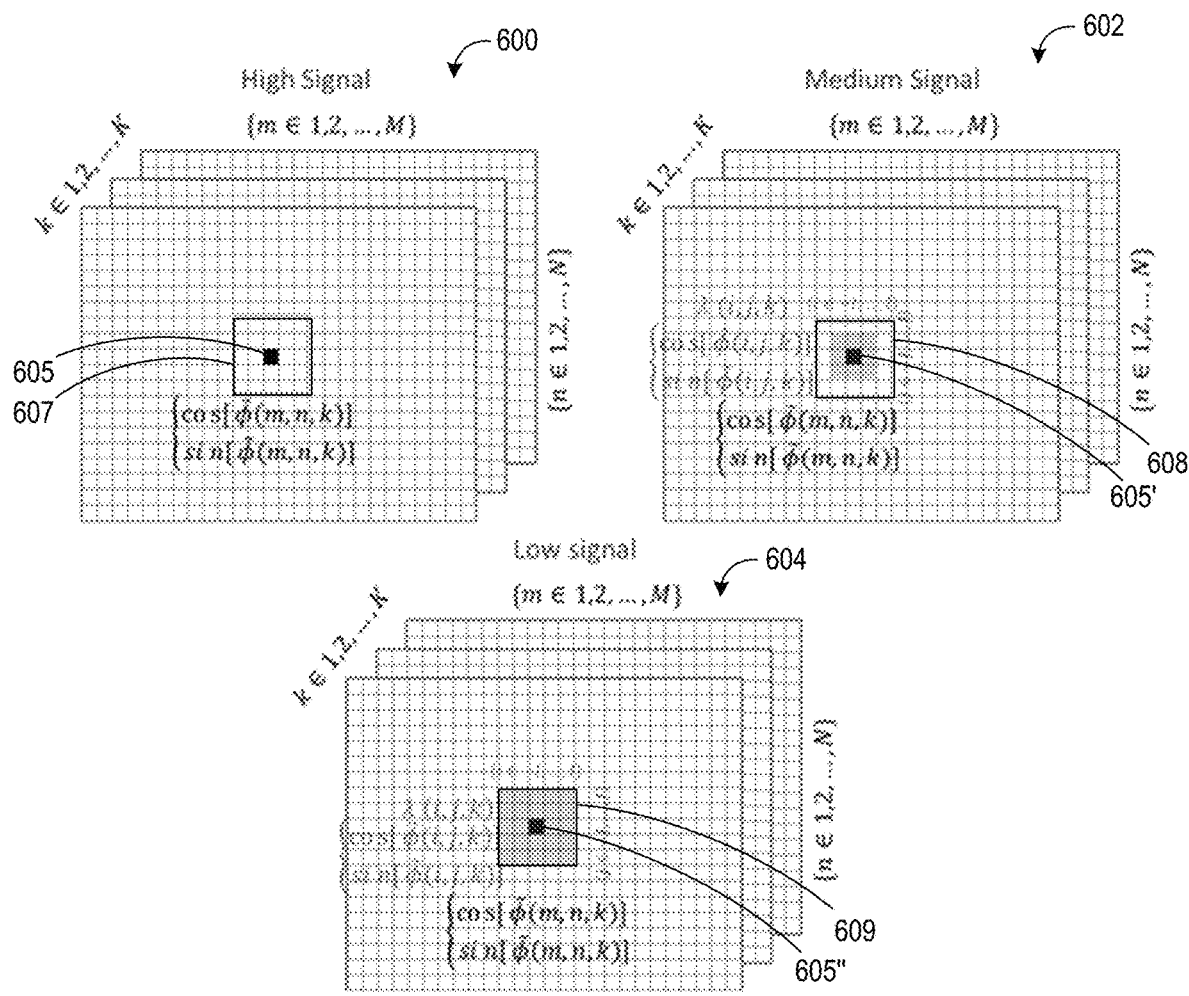
FIG. 6 shows a schematic depiction of example kernels comprising zeroes added to a fixed size kernel to adjust the kernel size in an adaptive complex domain unwrapping process.

As mentioned above, some ToF sensors may utilize a fixed kernel size, in which case adaptive complex domain phase unwrapping may be applied by filling locations in the fixed-size kernel with zeroes to create effectively smaller kernel sizes. FIG. 6 illustrates example fixed-size kernels used in an adaptive complex domain unwrapping process adapted for a relatively higher signal in multifrequency frame 600, adapted for a medium signal in multifrequency frame 602, and adapted for a relatively lower signal in multifrequency frame 604. Further, a fixed-size kernel 607 having a size of 5×5 pixels is used for unwrapping a selected pixel 605. As described above, a smaller kernel may be used for a pixel with a relatively higher signal. Thus, locations in fixed-size kernel 607 are filled with zeros to create an effective kernel size of 1×1 pixel.

In contrast, multifrequency frame 602 has a lower intensity signal S̃ than multifrequency frame 600 at pixel 605'. As such, a fixed-size kernel 608 used for denoising selected pixel 605' may be filled with a fewer number of zeroes than fixed-size kernel 607, effectively creating a kernel of size 3×3 pixels. Further, multifrequency frame 604 has a lower intensity signal S̃ at pixel 605" than for pixels 605 and 605'. As such, multifrequency frame 604 uses a kernel 609 having the given fixed-kernel size of 5×5 pixels, without filling any locations of the kernel 609 with zeroes.

Figure 7:
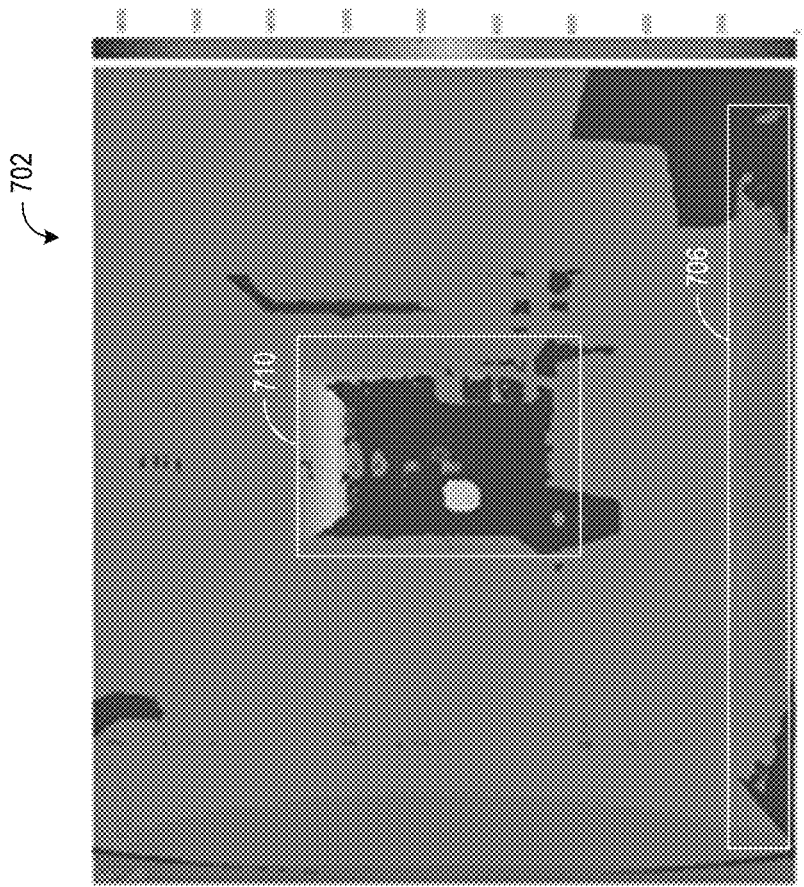
FIG. 7 shows an experimental image produced using nonadaptive ToF processing and an experimental image produced using adaptive ToF processing.
Figure 7:
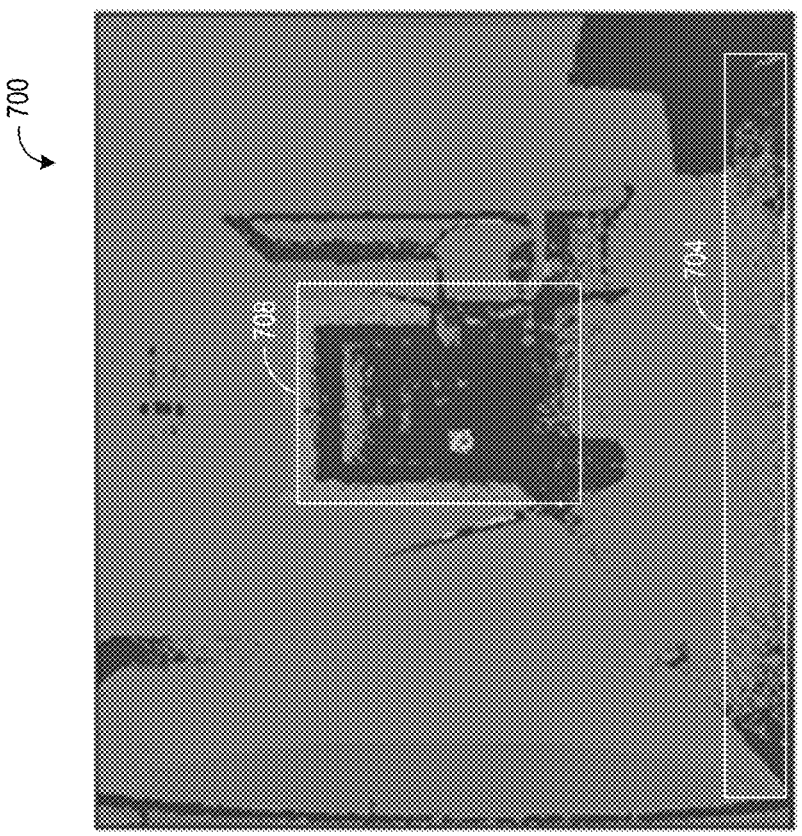
Figure 9:
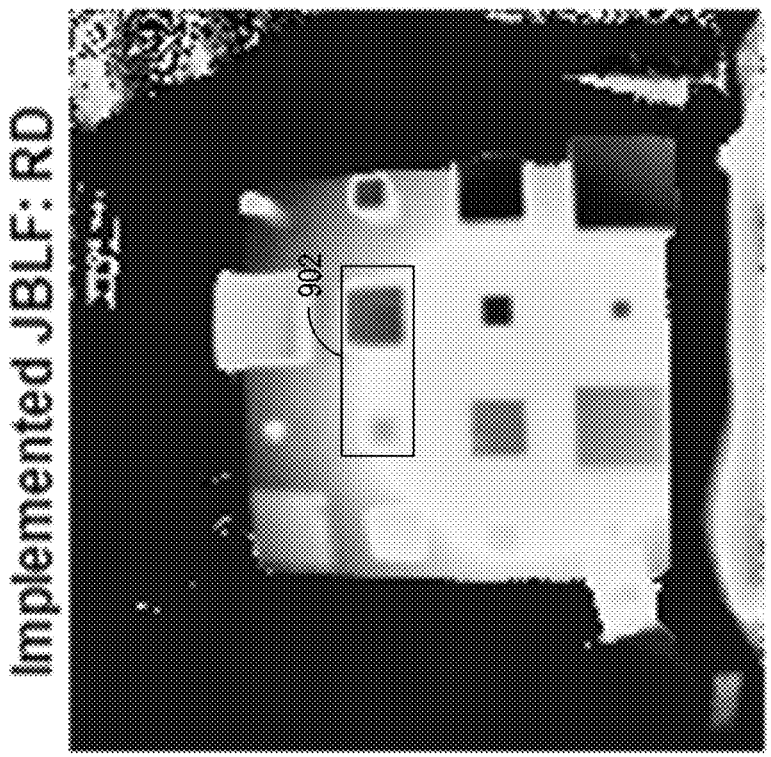
FIGS. 8-11 show images resulting from applying different filters in an example adaptive denoising process.
Figure 8:
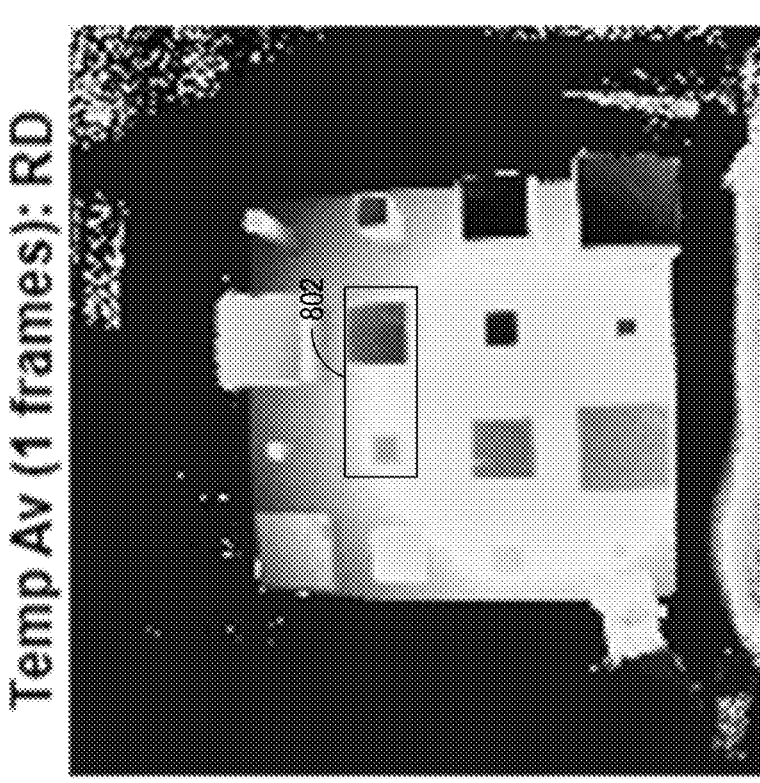
Figure 11:
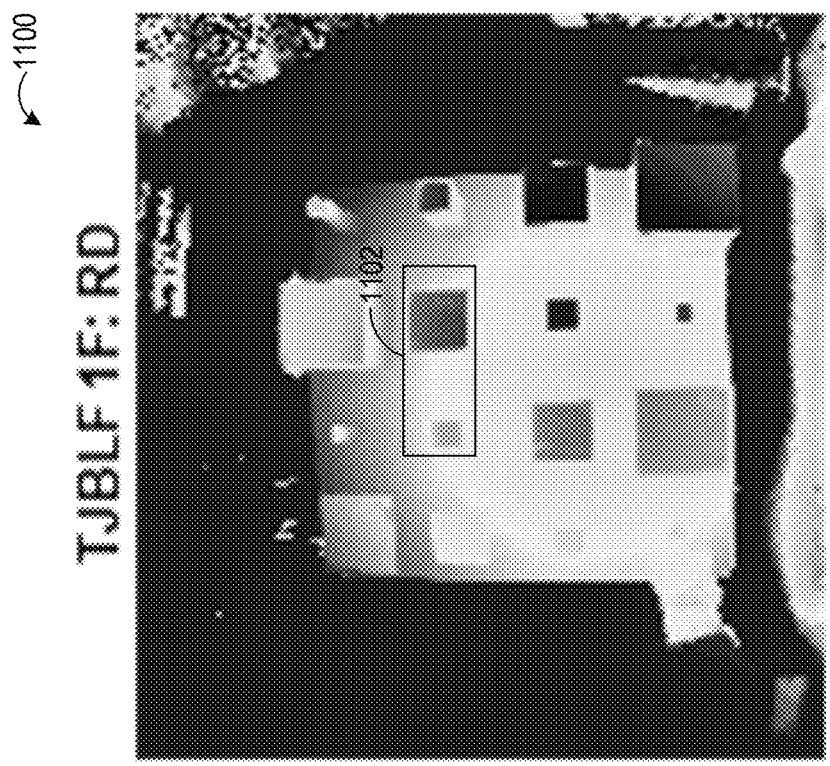
Figure 10:
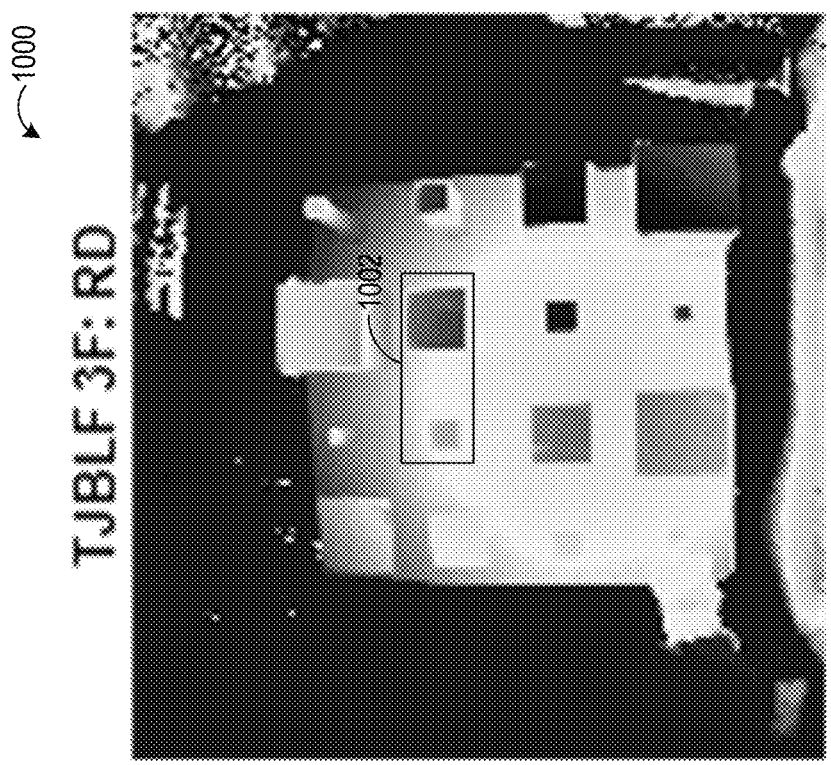

FIG. 7 shows an example image 700 of a scene resulting from nonadaptive ToF processing, and an example image 702 of the same scene resulting from the adaptive ToF processing methods as disclosed herein. Image 702 contains less noise than image 700, and comprises sharper features. For instance, bottom edge 704 compared to bottom edge 706 shows an area of relatively lower light intensity, where the bottom edge 706 shows more stable, consistent values than bottom edge 704. Further, the edges of relatively higher light intensity around the dark hallway at 710 appear to have sharper transitions than the edges at 708.

As described above, different filters may be utilized in calculating the edge-preserving normalized weighting coefficients for use in adaptive denoising (Equation 1) and in adaptive unwrapping (Equation 7). FIGS. 8-11 show example images resulting from applying different filters to a denoising process. Image 800 shows an example using a temporal averaging method, image 900 shows an example utilizing a JBLF filter, image 1000 shows an example using a TJBLF filter in which coefficients are calculated independently per frequency (three frequencies in this example (TJBLF 3F)), and image 1100 shows an example using a truncated joint bilateral filter in which coefficients are calculated only for the highest frequency, and then reused for any lower frequencies (TJBLF 1F). The temporal averaging image 800 is an average of 20 frames over nine captures, totaling 180 captures. While temporal averaging provides a relatively sharp image, it is computationally costly and time-consuming. Image 900 resulting from JBLF shows relatively blurrier edges in region 902. In contrast, region 1002 in image 1000, as well as region 1102 in image 1100, both have a similar sharpness to region 802 of image 800 resulting from temporal averaging, and may be computed more efficiently than temporal averaging.

Figure 12:
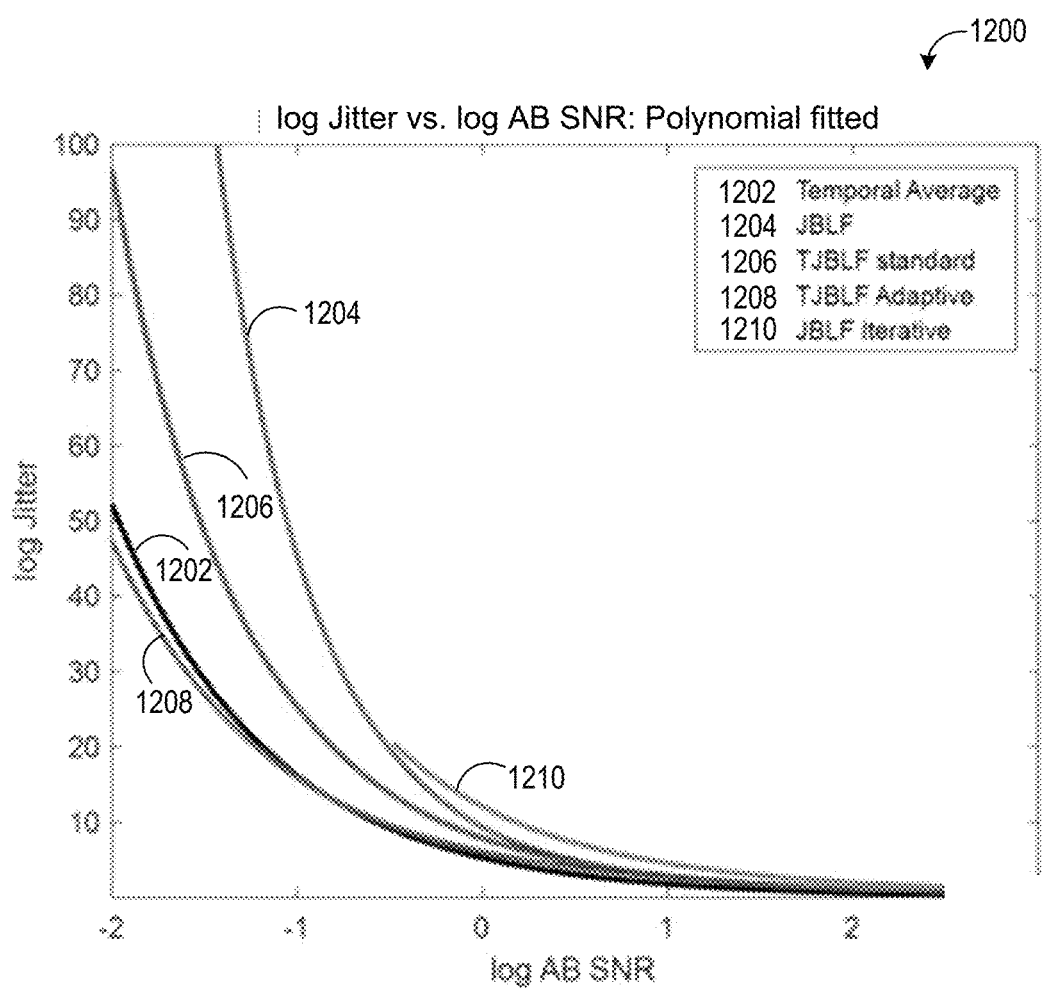
FIG. 12 shows a graph depicting a plot of log jitter versus log active brightness signal-to-noise ratio for various filters used in denoising.

FIG. 12 shows an example data regression graph 1200 of log jitter versus log of active brightness signal-to-noise ratio (log AB SNR) for a temporal average filter 1202, JBLF 1204, TJBLF standard 1206, TJBLF adaptive 1208, and JBLF iterative 1210. TJBLF standard 1206 and TJBLF adaptive 1208 show improvements in jitter at lower levels of active brightness. TJBLF adaptive 1208 shows a slight improvement in jitter compared to TJBLF standard 1206, and may provide for edges with less noise than with TJBLF standard and JBLF iterative. TJBLF adaptive may therefore help to preserve frequencies even without high SNR.

Figure 13:
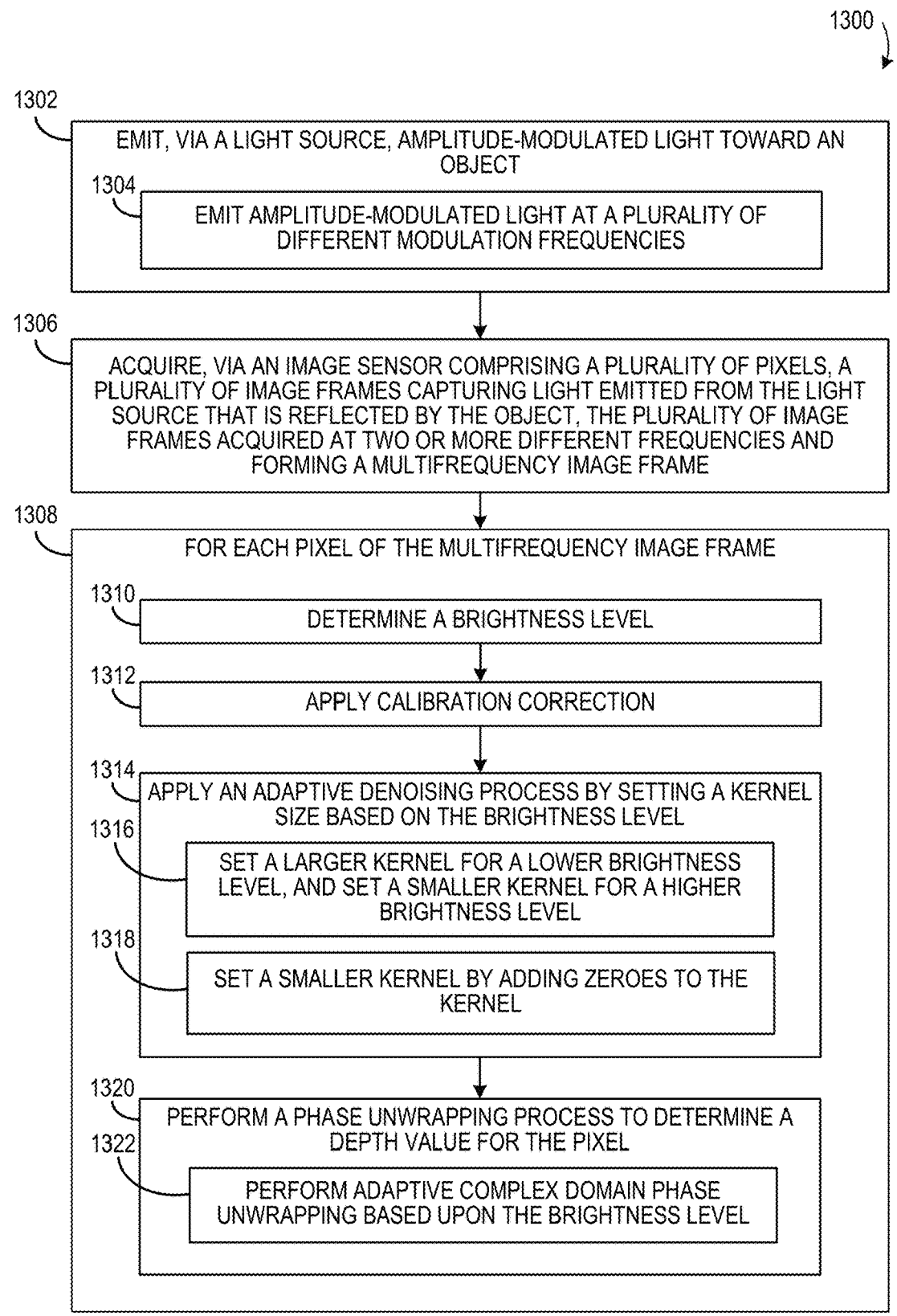
FIG. 13 shows a flow diagram depicting an example method for signal processing in a ToF system.

FIG. 13 shows a flow diagram depicting an example method 1300 for processing signals in a ToF imaging system. Method 1300 includes, at 1302, emitting, via a light source, amplitude-modulated light toward an object. This may include, at 1304, emitting light at a plurality of different modulation frequencies to increase an unambiguous image range of the ToF imaging system. Method 1300 further includes, at 1306, acquiring, via an image sensor, a plurality of image frames capturing light emitted from the light source that is reflected by the object. The plurality of image frames may be acquired at two or more different frequencies of the amplitude-modulated light and collectively form a multifrequency frame. Further, multiple image samples may be acquired at different phase locations for each frequency. Continuing, for each pixel of the multifrequency frame at 1308, method 1300 includes, at 1310, determining a brightness level, and at 1312, applying a signal calibration correction to the image frame.

Method 1300 further includes, at 1314, applying an adaptive denoising process by setting a kernel size based on the brightness level. As described above, in some examples adaptive denoising may be applied in accordance with Equation 1 and Equation 2. More generally, setting the kernel sizes may include, at 1316, setting a larger kernel for a lower brightness level and setting a smaller kernel for a higher brightness level. In scenarios where a fixed kernel is used (depending on the hardware of the ToF system), setting a smaller kernel may include, at 1318, adding zeroes to the kernel, as described above. Next, method 1300 includes, at 1320, performing a phase unwrapping process to determine a depth value for the pixel. In some examples, phase unwrapping may include, at 1322, performing an adaptive complex domain phase unwrapping based upon the brightness level. For example, phase unwrapping may be applied in accordance with Equation 6 and Equation 7, as described above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
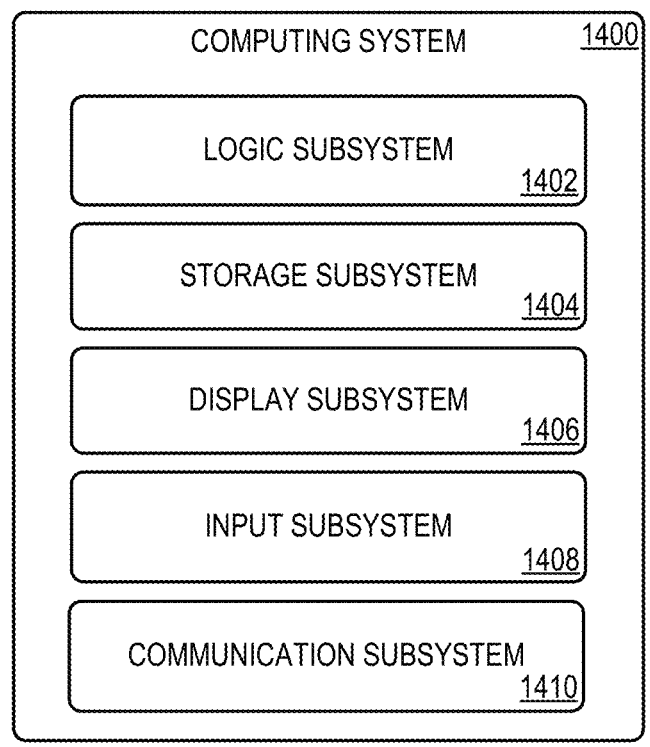
FIG. 14 is a block diagram of an example computing system.

FIG. 14 schematically shows a non-limiting embodiment of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices. Computing system 1400 may take the form of ToF camera 100 and/or electronic controller 116, as examples.

Computing system 1400 includes a logic subsystem 1402 and a storage subsystem 1404. Computing system 1400 may optionally include a display subsystem 1406, input subsystem 1408, communication subsystem 1410, and/or other components not shown in FIG. 14.

Logic subsystem 1402 includes one or more physical devices configured to execute instructions. For example, logic subsystem 1402 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1402 may include one or more processors configured to execute software instructions. Additionally or alternatively, logic subsystem 1402 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1404 includes one or more physical devices configured to hold instructions executable by logic subsystem 1402 to implement the methods and processes described herein. When such methods and processes are implemented, the state of storage subsystem 1404 may be transformed—e.g., to hold different data.

Storage subsystem 1404 may include removable and/or built-in devices. Storage subsystem 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1404 may include volatile, nonvolatile, dynamic, static, read/write, read-only, random-access, sequential-access, location-addressable, file-addressable, and/or content-addressable devices.

It will be appreciated that storage subsystem 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1402 and storage subsystem 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1406 may be used to present a visual representation of data held by storage subsystem 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic subsystem 1402 and/or storage subsystem 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

Another example provides a method for signal processing in a time of flight system, the method comprising, emitting, via a light source, amplitude-modulated light toward an object, acquiring, via an image sensor comprising a plurality of pixels, a plurality of image frames capturing light emitted from the light source that is reflected by the object, wherein the plurality of image frames are acquired at two or more different frequencies of the amplitude-modulated light and collectively form a multifrequency frame, and for each pixel of the multifrequency frame, determining a brightness level, applying an adaptive denoising process by setting a kernel size based on the brightness level, and performing a phase unwrapping process to determine a depth value for the pixel. Setting the kernel size may additionally or alternatively include setting a larger kernel for a lower brightness level, and setting a smaller kernel for a higher brightness level. Setting a smaller kernel may additionally or alternatively include adding zeroes to a kernel. Applying the adaptive denoising process may additionally or alternatively include applying:

$$S(m, n, k) = \sum_{i=-I}^{I} \sum_{j=-J}^{J} \lambda(i, j, k) \tilde{S}(m, n, k) \text{ with } \sum_{i=-I}^{I} \sum_{j=-J}^{J} \lambda(i, j, k) = 1$$

wherein $\tilde{S}(m, n, k)$ is a signal corresponding to pixel (m,n) for a frequency k, of an array of size (M, N) with $\{m \in 1, 2, \ldots, M\}$, and $\{n \in 1, 2, \ldots, N\}$, for a frequency $k \in 1, 2, \ldots, K$, $S(m, n, k)$ is a signal with reduced noise, represented as a weighted sum of neighboring pixels, $\{i \in -I, -I+1, \ldots, I\}$ and $\{j \in -J, -J+1, \ldots, J\}$, and $\lambda(i, j, k)$ are edge-preserving normalized weighting coefficients. Additionally or alternatively, $$\lambda(i, j, k) = \frac{1}{Norm(m, n, k)} \xi(i, j, k),$$

wherein $$\xi(i, j, k) = \exp\{-[(m-i)^2 + (n-j)^2]/\sigma_{sm}^2\} \exp[-\|\tilde{S}(m, n, k) - \tilde{S}(i, j, k)\|^2/\sigma_{sh}^2],$$

and Norm $(m, n, k) = \sum_{i=-I}^{I} \sum_{j=-J}^{J} \xi(i, j, k)$, and wherein $\sigma_{sm}^2$ and $\sigma_{sh}^2$ are parameters to adjust for one or more of smoothing and sharpening. Additionally or alternatively, $$\lambda(i, j, k) = \frac{1}{Norm(m, n, k)} \xi(i, j, k),$$

wherein $\xi(i, j, k) = \gamma(i, j, k) I_\tau(m, n, k)$, wherein $$\gamma(i, j, k) \to 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2},$$

and wherein $$I_\tau(m, n, k) = \begin{cases} 0 \text{ if } \gamma(i, j, k) < \tau(m, n, k) \\ 1 \text{ if } \gamma(i, j, k) \geq \tau(m, n, k) \end{cases}.$$

In this example, $\tau(m, n, k)$ may additionally or alternatively be variable. Performing the phase unwrapping process may additionally or alternatively include performing adaptive phase unwrapping based upon the brightness level. Performing the adaptive phase unwrapping based upon the brightness level may additionally or alternatively include applying $$\begin{cases} \cos\ [\tilde{\phi}(i, j, k)] = \frac{\tilde{S}_r(i, j, k)}{\widetilde{AB}(i, j, k)} \\ \sin\ [\tilde{\phi}(i, j, k)] = \frac{\tilde{S}_i(i, j, k)}{\widetilde{AB}(i, j, k)} \end{cases},$$

wherein $\widetilde{AB}(i, j, k) = \sqrt{(\tilde{S}_r(i,j,k))^2 + (\tilde{S}_i(i,j,k))^2}$. In this example, $\cos\ [\phi(i, j, k)]$ and $\sin\ [\phi(i, j, k)]$ may additionally or alternatively represent a signal with reduced noise and are determined by:

$$\begin{cases} \cos\ (\phi(i, j, k)) = \sum_{i=-I}^{I} \sum_{j=-J}^{J} \lambda(i, j, k) \cos\ [\tilde{\phi}(i, j, k)] \\ \sin\ [\phi(i, j, k)] = \sum_{i=-I}^{I} \sum_{j=-J}^{J} \lambda(i, j, k) \sin\ [\tilde{\phi}(i, j, k)] \end{cases}.$$

Another example provides a time of flight system, comprising a light source, an image sensor comprising a plurality of pixels, memory comprising instructions stored thereon, and a processor configured to execute the instructions to emit amplitude-modulated light from the light source toward an object, acquire via the image sensor a plurality of image frames capturing light emitted from the light source that is reflected by the object, wherein the plurality of image frames are acquired at two or more different frequencies of the amplitude-modulated light and collectively form a multifrequency frame, and for each pixel of the multifrequency frame, determine a brightness level, apply an adaptive denoising process by setting a kernel size based on the brightness level, and perform a phase unwrapping process to determine a depth value for the pixel. The instructions may additionally or alternatively be executable to set a larger kernel for a lower brightness level, and set a smaller kernel for a higher brightness level. The instructions may additionally or alternatively be executable to set a smaller kernel by adding zeroes to a kernel. The instructions may additionally or alternatively be executable to emit amplitude-modulated light at a plurality of different modulation frequencies. The instructions may additionally or alternatively be executable to apply the adaptive denoising process by applying:

$$S(m, n, k) = \sum_{i=-I}^{I} \sum_{j=-J}^{J} \lambda(i, j, k) \tilde{S}(m, n, k) \text{ with } \sum_{i=-I}^{I} \sum_{j=-J}^{J} \lambda(i, j, k) = 1$$

wherein $\tilde{S}(m, n, k)$ is a signal corresponding to pixel $(m,n)$ for a frequency $k$, of an array of size $(M, N)$ with $\{m \in 1, 2, \ldots, M\}$, and $\{n \in 1, 2, \ldots, N\}$, for a frequency $k \in 1, 2, \ldots, K$, $S(m, n, k)$ is a signal with reduced noise, represented as a weighted sum of neighboring pixels, $\{i \in -I, -I+1, \ldots, I\}$ and $\{j \in -J, -J+1, \ldots, J\}$, and $\lambda(i, j, k)$ are edge-preserving normalized weighting coefficients. Additionally or alternatively, $$\lambda(i, j, k) = \frac{1}{Norm(m, n, k)} \xi(i, j, k),$$

wherein $\xi(i,j,k) = \gamma(i,j,k) I_\tau(m, n, k)$, wherein $$\gamma(i, j, k) \to 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2},$$

and wherein $$I_\tau(m, n, k) = \begin{cases} 0 \text{ if } \gamma(i, j, k) < \tau(m, n, k) \\ 1 \text{ if } \gamma(i, j, k) \geq \tau(m, n, k) \end{cases},$$

The instructions may additionally or alternatively be executable to perform the phase unwrapping process by using an adaptive complex domain unwrapping formula comprising:

$$\begin{cases} \cos\ [\tilde{\phi}(i, j, k)] = \frac{\tilde{S}_r(i, j, k)}{\widetilde{AB}(i, j, k)} \\ \sin\ [\tilde{\phi}(i, j, k)] = \frac{\tilde{S}_i(i, j, k)}{\widetilde{AB}(i, j, k)} \end{cases},$$

wherein $\widetilde{AB}(i, j, k) = \sqrt{(\tilde{S}_r(i,j,k))^2 + (\tilde{S}_i(i,j,k))^2}$, wherein $\cos\ [\phi(i, j, k)]$ and $\sin\ [\phi(i, j, k)]$ represent a signal with reduced noise and are determined by:

$$\begin{cases} \cos[\phi(i,j,k)] = \sum_{i=-I}^{I}\sum_{j=-J}^{J} \lambda(i,j,k)\cos[\tilde{\phi}(i,j,k)] \\ \sin[\phi(i,j,k)] = \sum_{i=-I}^{I}\sum_{j=-J}^{J} \lambda(i,j,k)\sin[\tilde{\phi}(i,j,k)] \end{cases}$$

Additionally or alternatively, $$\lambda(i,j,k) = \frac{1}{Norm(m,n,k)}\xi(i,j,k),$$

wherein $$\xi(i,j,k) = 1 - \frac{\|\tilde{S}(m,n,k) - \tilde{S}(i,j,k)\|^2}{\sigma_{sh}^2 \sum_{i=-I}^{I}\sum_{j=-J}^{J} \|\tilde{S}(m,n,k) - \tilde{S}(i,j,k)\|^2}, \text{ and}$$

$$Norm(m,n,k) = \sum_{i=-I}^{I}\sum_{j=-J}^{J} \xi(i,j,k),$$

and wherein $\sigma_{sh}^2$ is a parameter to adjust for sharpening.

Another example provides a time of flight depth imaging system, comprising a light source, an image sensor, memory comprising instructions stored thereon, and a processor configured to execute the instructions to emit amplitude-modulated light from the light source toward an object, acquire via the image sensor a plurality of image frames capturing light emitted from the light source that is reflected by the object, wherein the plurality of image frames are acquired at two or more different frequencies of the amplitude-modulated light and collectively form a multifrequency frame, and for each pixel of the multifrequency frame, determine a brightness level, apply an adaptive denoising process by setting a kernel size based on the brightness level, and perform an adaptive complex domain phase unwrapping based on the brightness level to determine a depth value for the pixel. The instructions may additionally or alternatively be executable to perform the adaptive complex domain phase unwrapping comprise instructions executable to apply:

$$\begin{cases} \cos[\tilde{\phi}(i,j,k)] = \frac{\tilde{S}_r(i,j,k)}{\tilde{AB}(i,j,k)} \\ \sin[\tilde{\phi}(i,j,k)] = \frac{\tilde{S}_i(i,j,k)}{\tilde{AB}(i,j,k)} \end{cases},$$

wherein $\tilde{AB}(i,j,k) = \sqrt{(\tilde{S}_r(i,j,k))^2 + (\tilde{S}_i(i,j,k))^2}$, and wherein $\cos[\phi(i,j,k)]$ and $\sin[\phi(i,j,k)]$ represent a signal with reduced noise and are determined by:

$$\begin{cases} \cos[\phi(i,j,k)] = \sum_{i=-I}^{I}\sum_{j=-J}^{J} \lambda(i,j,k)\cos[\tilde{\phi}(i,j,k)] \\ \sin[\phi(i,j,k)] = \sum_{i=-I}^{I}\sum_{j=-J}^{J} \lambda(i,j,k)\sin[\tilde{\phi}(i,j,k)] \end{cases}$$

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for signal processing in a time of flight system, the method comprising:
    emitting, via a light source, amplitude-modulated light toward an object;
    acquiring, via an image sensor comprising a plurality of pixels, a plurality of image frames capturing light emitted from the light source that is reflected by the object, wherein the plurality of image frames are acquired at two or more different frequencies of the amplitude-modulated light and collectively form a multifrequency frame; and
    for each pixel of the multifrequency frame,
        determining a brightness level,
        applying an adaptive denoising process by setting a kernel size based on the brightness level, and
        performing a phase unwrapping process to determine a depth value for the pixel.

2. The method of claim 1, wherein setting the kernel size comprises setting a larger kernel for a lower brightness level, and setting a smaller kernel for a higher brightness level.

3. The method of claim 2, wherein setting a smaller kernel comprises adding zeroes to a kernel.

4. The method of claim 1, wherein applying the adaptive denoising process comprises applying:

$$S(m,n,k) = \sum_{i=-I}^{I}\sum_{j=-J}^{J} \lambda(i,j,k)\tilde{S}(m,n,k) \text{ with } \sum_{i=-I}^{I}\sum_{j=-J}^{J} \lambda(i,j,k) = 1$$

wherein
    $\tilde{S}$(m, n, k) is a signal corresponding to pixel (m,n) for a frequency k, of an array of size (M, N) with {m∈1, 2, . . . , M}, and {n∈1, 2, . . . , N}, for a frequency k∈1, 2, . . . , K,
    S(m, n, k) is a signal with reduced noise, represented as a weighted sum of neighboring pixels, {i∈−I, −I+1, . . . , I} and {j∈−J, −J+1, . . . , J}, and
    λ(i, j, k) are edge-preserving normalized weighting coefficients.

5. The method of claim 4, wherein $$\lambda(i,j,k) = \frac{1}{Norm(m,n,k)}\xi(i,j,k),$$

wherein $$\xi(i, j, k) = \exp\{-[(m-i)^2 + (n-j)^2]/\sigma_{sm}^2\} \exp\{-\|\tilde{S}(m, n, k) - \tilde{S}(i, j, k)\|^2/\sigma_{sh}^2\}, \text{ and}$$

$$Norm(m, n, k) = \sum_{i=-I}^{I} \sum_{j=-J}^{J} \xi(i, j, k),$$

and wherein $\sigma_{sm}^2$ and $\sigma_{sh}^2$ are parameters to adjust for one or more of smoothing and sharpening.

6. The method of claim 4, wherein $$\lambda(i, j, k) = \frac{1}{Norm(m, n, k)} \xi(i, j, k),$$

wherein $$\xi(i,j,k) = \gamma(i,j,k) I_\tau(m,n,k),$$

wherein $$\gamma(i, j, k) \to 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2},$$

and wherein $$I_\tau(m, n, k) = \begin{cases} 0 & \text{if } \gamma(i, j, k) < \tau(m, n, k) \\ 1 & \text{if } \gamma(i, j, k) \geq \tau(m, n, k) \end{cases}.$$

7. The method of claim 6, wherein $\tau(m, n, k)$ is variable.

8. The method of claim 1, wherein performing the phase unwrapping process comprises performing adaptive phase unwrapping based upon the brightness level.

9. The method of claim 8, wherein performing the adaptive phase unwrapping based upon the brightness level comprises applying $$\begin{cases} \cos[\tilde{\phi}(i, j, k)] = \frac{\tilde{S}_r(i, j, k)}{\overline{AB}(i, j, k)} \\ \sin[\tilde{\phi}(i, j, k)] = \frac{\tilde{S}_i(i, j, k)}{\overline{AB}(i, j, k)} \end{cases},$$

wherein $\overline{AB}(i, j, k) = \sqrt{(\tilde{S}_r(i, j, k))^2 + (\tilde{S}_i(i, j, k))^2}$ 10. The method of claim 9, wherein $\cos[\phi(i, j, k)]$ and $\sin[\phi(i, j, k)]$ represent a signal with reduced noise and are determined by:

$$\begin{cases} \cos[\phi(i, j, k)] = \sum_{i=-I}^{I} \sum_{j=-J}^{J} \lambda(i, j, k) \cos[\tilde{\phi}(i, j, k)] \\ \sin[\phi(i, j, k)] = \sum_{i=-I}^{I} \sum_{j=-J}^{J} \lambda(i, j, k) \sin[\tilde{\phi}(i, j, k)] \end{cases}.$$

11. A time of flight system, comprising:
a light source;
an image sensor comprising a plurality of pixels;
memory comprising instructions stored thereon; and
a processor configured to execute the instructions to:
emit amplitude-modulated light from the light source toward an object;
acquire via the image sensor a plurality of image frames capturing light emitted from the light source that is reflected by the object, wherein the plurality of image frames are acquired at two or more different frequencies of the amplitude-modulated light and collectively form a multifrequency frame; and
for each pixel of the multifrequency frame,
determine a brightness level;
apply an adaptive denoising process by setting a kernel size based on the brightness level; and
perform a phase unwrapping process to determine a depth value for the pixel.

12. The time of flight system of claim 11, wherein the instructions are executable to set a larger kernel for a lower brightness level, and set a smaller kernel for a higher brightness level.

13. The time of flight system of claim 12, the instructions are executable to set a smaller kernel by adding zeroes to a kernel.

14. The time of flight system of claim 11, wherein the instructions are executable to emit amplitude-modulated light at a plurality of different modulation frequencies.

15. The time of flight system of claim 11, wherein the instructions are executable to apply the adaptive denoising process by applying:

$$S(m, n, k) = \sum_{i=-I}^{I} \sum_{j=-J}^{J} \lambda(i, j, k) \tilde{S}(m, n, k) \text{ with } \sum_{i=-I}^{I} \sum_{j=-J}^{J} \lambda(i, j, k) = 1$$

wherein
$\tilde{S}(m, n, k)$ is a signal corresponding to pixel (m,n) for a frequency k, of an array of size (M, N) with $\{m \in 1, 2, \ldots, M\}$, and $\{n \in 1, 2, \ldots, N\}$, for a frequency $k \in 1, 2, \ldots, K$,
$S(m, n, k)$ is a signal with reduced noise, represented as a weighted sum of neighboring pixels, $\{i \in -I, -I+1, \ldots, I\}$ and $\{j \in -J, -J+1, \ldots, J\}$, and
$\lambda(i, j, k)$ are edge-preserving normalized weighting coefficients.

16. The time of flight system of claim 15, wherein $$\lambda(i, j, k) = \frac{1}{Norm(m, n, k)} \xi(i, j, k),$$

wherein $$\xi(i,j,k) = \gamma(i,j,k) I_\tau(m,n,k),$$

wherein $$\gamma(i, j, k) \to 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2},$$

and wherein $$I_\tau(m, n, k) = \begin{cases} 0 \text{ if } \gamma(i, j, k) < \tau(m, n, k) \\ 1 \text{ if } \gamma(i, j, k) \geq \tau(m, n, k) \end{cases}.$$

17. The time of flight system of claim 16, wherein the instructions are executable to perform the phase unwrapping process by using an adaptive complex domain unwrapping formula comprising:

$$\begin{cases} \cos[\tilde{\phi}(i, j, k)] = \dfrac{\tilde{S}_r(i, j, k)}{\widetilde{AB}(i, j, k)} \\ \sin[\tilde{\phi}(i, j, k)] = \dfrac{\tilde{S}_i(i, j, k)}{\widetilde{AB}(i, j, k)} \end{cases},$$

wherein $\widetilde{AB}(i, j, k) = \sqrt{(\tilde{S}_r(i, j, k))^2 + (\tilde{S}_i(i, j, k))^2}$, wherein $\cos[\phi(i, j, k)]$ and $\sin[\phi(i, j, k)]$ represent a signal with reduced noise and are determined by:

$$\begin{cases} \cos[\phi(i, j, k)] = \sum_{i=-I}^{I} \sum_{j=-J}^{J} \lambda(i, j, k) \cos[\tilde{\phi}(i, j, k)] \\ \sin[\phi(i, j, k)] = \sum_{i=-I}^{I} \sum_{j=-J}^{J} \lambda(i, j, k) \sin[\tilde{\phi}(i, j, k)] \end{cases}.$$

18. The time of flight system of claim 15, wherein $$\lambda(i, j, k) = \frac{1}{Norm(m, n, k)} \xi(i, j, k),$$

wherein $$\xi(i, j, k) = 1 - \frac{\|\tilde{S}(m, n, k) - \tilde{S}(i, j, k)\|^2}{\sigma_{sh}^2 \sum_{i=-I}^{I} \sum_{j=-J}^{J} \|\tilde{S}(m, n, k) - \tilde{S}(i, j, k)\|^2}, \text{ and}$$

$$Norm(m, n, k) = \sum_{i=-I}^{I} \sum_{j=-J}^{J} \xi(i, j, k),$$

and wherein $\sigma_{sh}^2$ is a parameter to adjust for sharpening.

19. A time of flight depth imaging system, comprising
a light source;
an image sensor;
memory comprising instructions stored thereon; and
a processor configured to execute the instructions to:
   emit amplitude-modulated light from the light source toward an object,
   acquire via the image sensor a plurality of image frames capturing light emitted from the light source that is reflected by the object, wherein the plurality of image frames are acquired at two or more different frequencies of the amplitude-modulated light and collectively form a multifrequency frame, and
   for each pixel of the multifrequency frame,
      determine a brightness level;
      apply an adaptive denoising process by setting a kernel size based on the brightness level; and
      perform an adaptive complex domain phase unwrapping based on the brightness level to determine a depth value for the pixel.

20. The time of flight system of claim 19, wherein the instructions executable to perform the adaptive complex domain phase unwrapping comprise instructions executable to apply:

$$\begin{cases} \cos[\tilde{\phi}(i, j, k)] = \dfrac{\tilde{S}_r(i, j, k)}{\widetilde{AB}(i, j, k)} \\ \sin[\tilde{\phi}(i, j, k)] = \dfrac{\tilde{S}_i(i, j, k)}{\widetilde{AB}(i, j, k)} \end{cases},$$

wherein $\widetilde{AB}(i,j,k) = \sqrt{(\tilde{S}_r(i,j,k))^2 + (\tilde{S}_i(i,j,k))^2}$, and wherein $\cos[\phi(i, j, k)]$ and $\sin[\phi(i, j, k)]$ represent a signal with reduced noise and are determined by:

$$\begin{cases} \cos[\phi(i, j, k)] = \sum_{i=-I}^{I} \sum_{j=-J}^{J} \lambda(i, j, k) \cos[\tilde{\phi}(i, j, k)] \\ \sin[\phi(i, j, k)] = \sum_{i=-I}^{I} \sum_{j=-J}^{J} \lambda(i, j, k) \sin[\tilde{\phi}(i, j, k)] \end{cases}.$$

\* \* \* \* \*